H. O. BERNARD.
WATER COOLED WELDING ELECTRODE.
APPLICATION FILED JULY 23, 1913.

1,221,958.

Patented Apr. 10, 1917.
2 SHEETS—SHEET 2.

Witnesses:
Jas. E. Hutchinson.
Irma F. Buck.

Inventor:
Harry O. Bernard,
By J. L. Hutchinson, Attorneys

UNITED STATES PATENT OFFICE.

HARRY O. BERNARD, OF BIRMINGHAM, ALABAMA.

WATER-COOLED WELDING-ELECTRODE.

1,221,958. Specification of Letters Patent. Patented Apr. 10, 1917.

Application filed July 23, 1913. Serial No. 780,725.

*To all whom it may concern:*

Be it known that I, HARRY O. BERNARD, a citizen of the United States, residing at Birmingham, in the county of Jefferson and State of Alabama, have invented certain new and useful Improvements in Water-Cooled Welding-Electrodes, of which the following is a specification, reference being had therein to the accompanying drawing.

This invention relates to certain new and useful improvements in water cooled welding electrodes or welding points for electric spot welding machines, and the improvement comprises a cooling jacket which is adapted to entirely surround the electrode, said cooling jacket being so constructed and arranged that the water circulating therethrough is brought into direct contact with the electrode, thereby providing an effectual cooling means.

In many of the electric spot welding machines heretofore used separable dies and die points have been provided, and the dies have been specially constructed with water circulating passages, permitting the die points to be kept cool during the operation of the machine and thus preventing said points from wearing out as quickly as they otherwise would. It has been found from actual experience, however, that these separable die points even though subjected to a cooling method, wear very quickly, and are subject to many disadvantages and perform ineffective service in a very short space of time, in fact, necessitating their being discarded in many instances before not more than one-fourth of their length has been used.

In the present invention, however, the improvements have to deal with a one-piece die and die point, in the form of a copper rod, and this rod may be of any suitable or desired length, and capable of being adjustably secured upon the machine by any preferred type of clamping means. In constructing the electrodes in this manner, the points of the copper rods may be kept in perfect condition by simply dressing them up from time to time with an ordinary file or rasp.

In the use of an electrode of the type just described, I am enabled to use my improved water cooling jacket to be more particularly hereinafter described, the same adapted to be secured to and supported by said electrode at or near the welding point thereof, and said cooling jacket being readily adjustable along the rod, and of such construction as to form a cooling chamber entirely surrounding the electrode, which forms one of the walls of said cooling chamber.

Further objects and advantages will appear in the following description, it being understood that various changes in form, proportions and minor details of construction may be resorted to within the scope of the appended claims.

I have illustrated my invention in the accompanying drawings, in which.

Figure 1:
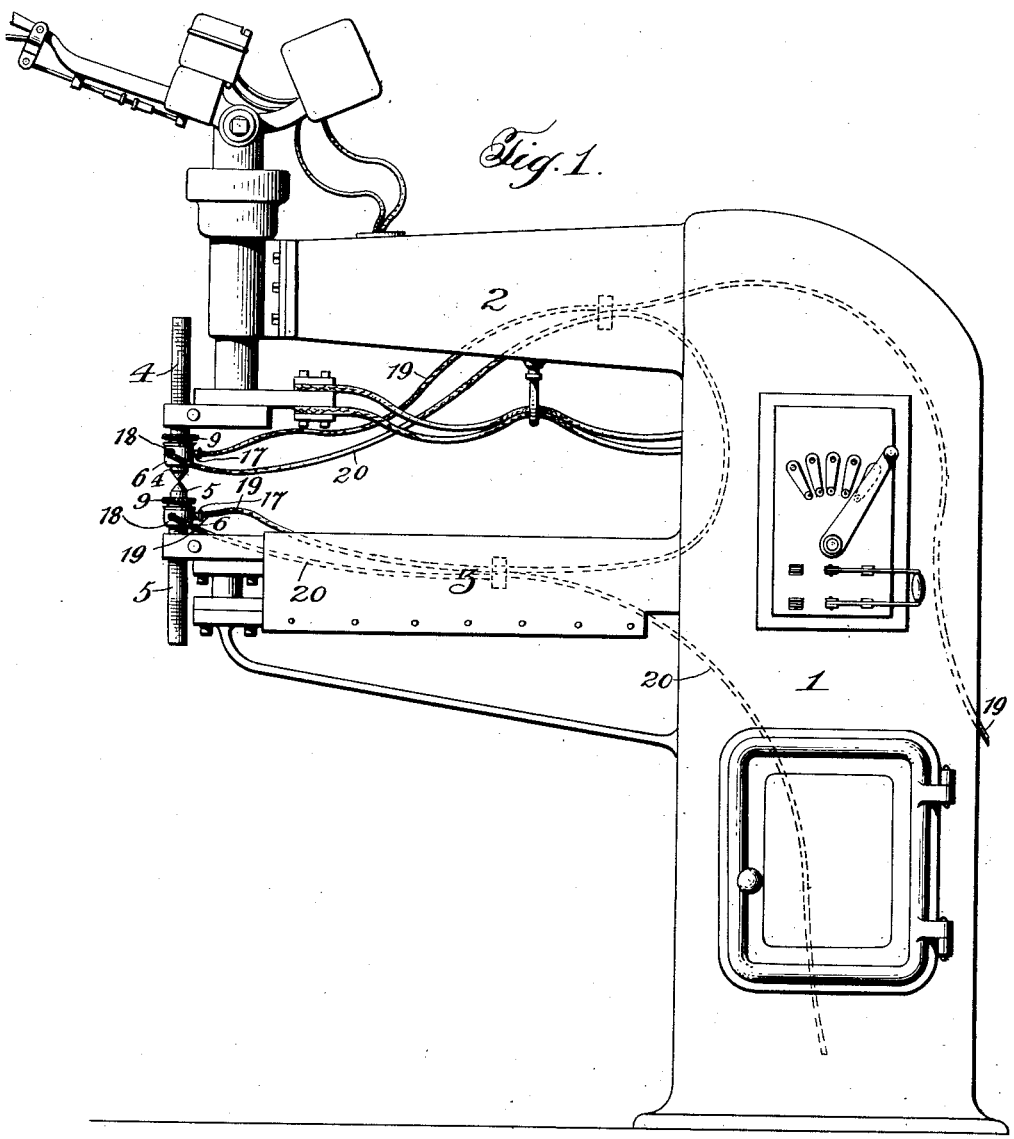
Figure 1 is a side elevation of a welding machine embodying my invention.
Figure 2:
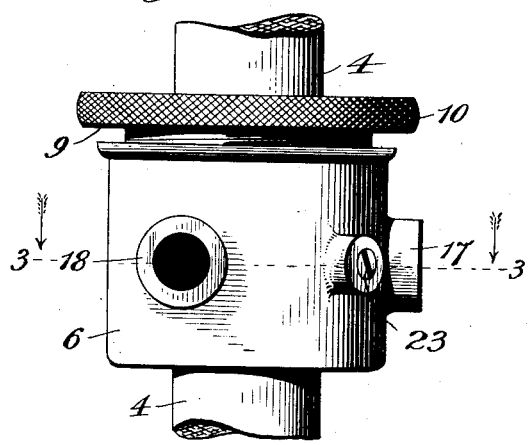
Fig. 2 is an enlarged side elevation of a portion of one of the electrodes and its cooling jacket.
Figure 4:
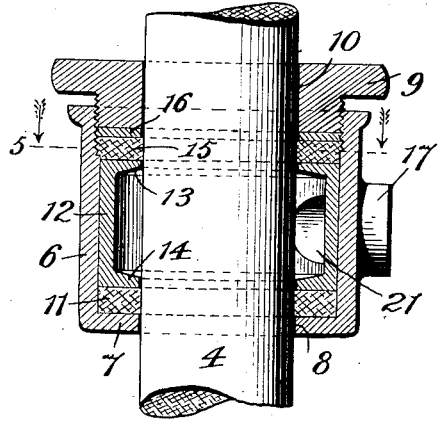
Fig. 4 is a vertical section of the same taken on the line 4—4 of Fig. 3.
Figure 3:
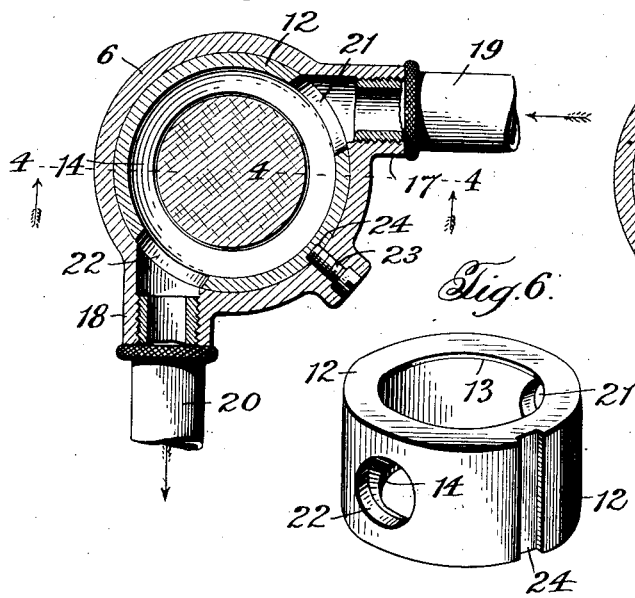
Fig. 3 is a horizontal section of the same taken on the line 3—3 of Fig. 2.
Figure 5:
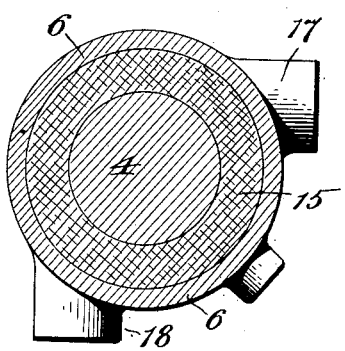
Fig. 5 is a horizontal section of the same taken on the line 5—5 of Fig. 4.
Figure 6:
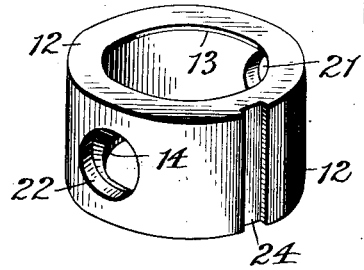
Fig. 6 is a detail perspective view of the flanged sleeve which forms the outer wall of the cooling chamber.

Referring to the drawings, 1 denotes the welding machine frame having the upper and lower horns 2 and 3 respectively, projecting from one side thereof, said upper horn carrying the movable welding die or electrode 4 and the associated control mechanism therefor, while the lower horn carries the stationary welding electrode 5 in any suitable manner, all of said features of construction being well understood in the art.

The upper and lower electrodes 4 and 5 just referred to, are, in the present instance, suitable lengths of copper rods clamped in proper position upon the upper and lower horns 2 and 3 respectively, and in this relation they are arranged for vertical adjustment to compensate for the wear incident to the filing of the welding points of said electrodes.

The important feature of the present invention resides in the provision of my improved cooling jacket, which completely surrounds the electrode and forms a cooling chamber about said electrode, said jacket being positioned thereon at a point near the welding end of the electrode. It is to be understood that a cooling jacket is used for each of the electrodes as will be perfectly obvious.

The cooling jacket just referred to comprises a casing 6, the bottom 7 of which has a centrally located opening 8 which is of a size to neatly fit or receive the electrode. This casing 6 is internally screw-threaded at its upper end to receive a screw cap 9, which screw cap is also provided with a centrally located opening 10 to receive the electrode. Within the casing 6 and resting upon the bottom 7 thereof is an elastic washer 11, and upon this washer rests a metal sleeve 12, said sleeve being of a size to neatly fit within the casing and having at its upper and lower ends respectively circular inwardly directed flanges 13 and 14, which as will be noted, surround the electrode and form the top and bottom of the cooling chamber. Located above the upper flange 13 and resting thereon is an elastic washer 15, similar to the washer 11 heretofore referred to, and resting upon this elastic washer is a metal washer 16 with which the lower end of the screw cap is adapted to engage.

It will thus be seen that when the screw cap is screwed into the casing the elastic washers 11 and 15 are compressed, washer 11 being compressed between the flange 14 and the bottom of the casing 7, and washer 15 being compressed between the metal washer 16 and flange 13, and by this operation the interior faces of said washers are expanded and brought into firm contact with the electrode, thus making water-tight connections at both of these points.

Referring further to the casing 6 it is to be noted that nipples 17 and 18 are provided, to which are connected the inlet and outlet pipes 19 and 20 respectively, of any suitable water circulating system. The sleeve 12 also has openings 21, 22, which register respectively with the openings through the nipples, and the sleeve is held in this position, that is to say, with the openings in registry, by means of a screw 23 passing through the casing and projecting within a vertically arranged slot 24 which effectually prevents rotation of the sleeve. This slot extends the full length of the sleeve, and it will thus be seen that said sleeve may be easily removed from the casing without removing the screw 23.

The construction of the cooling jacket thus being understood, it will be seen that an annular water chamber entirely surrounding the electrode is provided, and one in which the cooling medium, contained therein, is allowed to be brought into direct contact with said electrode, suitable stuffing boxes being provided as set forth above, for the purpose of providing water-tight connections between the cooling jacket and the electrode. It is to be noted that the elastic washers 11 and 15, forming a part of said stuffing boxes, also serve to provide a means for supporting the cooling jacket in proper position upon the electrode.

By this improved method of cooling the electrodes it is to be noted that the cooling medium is caused to be circulated entirely around the welding point, causing it to remain perfectly cool, and thereby greatly increasing the efficiency of the point for welding purposes, as well as prolonging the life of the point and saving about 70% of the copper formerly used in welding.

Having thus described my invention, what I claim and desire to secure by Letters Patent is:—

1. The method of cooling welding electrodes, which consists in surrounding said electrodes with a cooling medium which is brought into direct contact therewith.

2. The method of cooling welding electrodes, which consists in circulating a cooling fluid entirely around and in direct contact with the electrode.

3. A cooling means for welding electrodes, comprising a member coöperating with the electrode, and between which member and the exterior surface of the electrode is completely confined a cooling medium which is brought into direct contact with the electrode.

4. A cooling jacket for welding electrodes, comprising a casing surrounding the electrode, said casing being so constructed that the cooling medium contained therein is retained in direct contact with the exterior surface of said electrode.

5. A cooling means for welding electrodes, comprising a jacket surrounding the electrode and forming an annular chamber about the same, a stuffing box at each end of the jacket for providing water-tight connections between said jacket and the electrode, and connections between said chamber and a water supply system.

6. A cooling means for welding electrodes, comprising a jacket surrounding the electrode and forming an annular chamber about the same, and means for providing water-tight connections between said jacket and the electrode, said means also serving to support the jacket in proper position upon said electrode.

7. A cooling means for welding electrodes, comprisng a casing or jacket surrounding the electrode and forming an annular chamber about the same, an elastic washer within the casing and resting upon the bottom thereof, a sleeve fitting within said casing and having inwardly projecting annular flanges at its upper and lower ends, the lower annular flange resting upon said elastic washer, a second elastic washer positioned upon the upper annular flange of said sleeve, and a screw cap for said casing adapted to coöperate with the second mentioned elastic washer for creating pressure within the casing and thus inwardly expanding the elastic washers for bringing them into firm contact with the electrode, substantially as and for the purpose set forth.

8. A water cooled welding electrode, comprising a copper rod suitably supported for vertical adjustment, and a cooling jacket surrounding said rod and forming an annular chamber about the same, the cooling medium contained in said chamber adapted to be brought into direct contact with the rod.

9. A water cooled welding electrode, comprising a copper rod suitably supported for vertical adjustment, a cooling jacket surrounding said rod and forming an annular chamber about the same, a stuffing box at each end of the jacket for providing water-tight connections between said jacket and the rod, and connections between said chamber and a water supply system.

10. A cooling means for welding electrodes, comprising a casing or jacket surrounding the electrode and forming an annular chamber about the same, inlet and outlet connections for the casing, and a sleeve fitting within said casing and forming an element of the means for providing water-tight connections between the casing and the electrode, said sleeve having openings therethrough adapted to register with the openings through the inlet and outlet connections.

11. A cooling means for welding electrodes, comprising a casing or jacket surrounding the electrode and forming an annular chamber about the same, inlet and outlet connections for the casing, a sleeve fitting within said casing and forming an element of the means for providing water-tight connections between the casing and the electrode, said sleeve having openings therein registering with the openings through the inlet and outlet connections, and means for preventing turning of said sleeve within the casing.

12. A cooling means for welding electrodes, comprising a casing or jacket surrounding the electrode and forming an annular chamber about the same, inlet and outlet connections for the casing, a sleeve fitting within said casing and forming an element of the means for providing water-tight connections between the casing and the electrode, said sleeve having openings therein registering with the openings through the inlet and outlet connections, and means for preventing turning of the sleeve within the casing, said means consisting of a lug or projection formed upon the interior surface of the casing and engaging within a vertically arranged slot upon the outer face of the sleeve.

13. A cooling means for welding electrodes, comprising a casing or jacket surrounding the electrode and forming an annular chamber about the same, compressible means arranged at both ends of the casing and adapted to be expanded inwardly under compression to form water-tight connections between said casing and the electrode, and means for expanding said compressible means.

14. A cooling means for welding electrodes, comprising a casing or jacket surrounding the electrode and forming an annular chamber about the same, compressible means arranged at both ends of the casing and adapted to be expanded inwardly under compression to form water-tight connections between said casing and the electrode, and a single means for expanding the compressible means at both ends of the casing at one operation.

15. A cooling means for welding electrodes, comprising a casing or jacket surrounding the electrode and forming an annular chamber about the same, compressible means arranged at both ends of the casing and adapted to be expanded inwardly under compression to form water-tight connections between said casing and the electrode, and a cap screw-threaded into said casing and adapted for expanding the compressible means at both ends of the casing at one and the same operation.

In testimony whereof I have affixed my signature in presence of two witnesses.

HARRY O. BERNARD.

Witnesses:
JAMES W. DEAN,
L. E. BARR.